Feb. 7, 1961 F. G. BACK 2,971,051

VARIFOCAL, LONG BACK-FOCAL LENS FOR COLOR TELEVISION

Filed Dec. 8, 1958

INVENTOR.
Frank G. Back

By Albert F. Kronman

ATTORNEY 2,971,051

VARIFOCAL, LONG BACK-FOCAL LENS FOR COLOR TELEVISION

Frank G. Back, Lattingtown, N.Y.

Filed Dec. 8, 1958, Ser. No. 779,015

11 Claims. (Cl. 178—5.4)

This invention relates to cameras for use in the transmission of color television programs.

Presently known cameras used in the field of color television consist of highly complicated assemblies containing a large number of lenses and relays, together with numerous mirrors, filters and optical devices whereby light entering the camera goes through a relay system before it is broken into the three primary colors and directed at individual orthicon tubes. As a result of the construction of color television cameras as now used, large amounts of aberration such as field curvature are produced. In addition, excessive reflection losses are found in known cameras of this type. In order to secure enough light for presently used television cameras, an extremely high level of illumination is required which results in increased technical problems and discomfort to the persons being televised.

Accordingly, it is an object of the present invention to provide a color television lens and camera assembly which will operate successfully at much lower levels of illumination than is presently possible.

Another object of the present invention is to provide a color television lens system which will transmit truer colors.

A further object of the present invention is to reduce the size of color television cameras.

Still another object of the present invention is to provide a color television optical system and camera which gives a better picture quality because of less aberrations in the lens system.

A feature of the present invention is its use of a varifocal lens in combination with a color beam splitting device without the use of a relay system.

Another feature of the present invention is its use of prisms having color filters therebetween to split the light entering the camera into three color components, without compensation for plano filters thereby producing a better picture quality.

A further feature of the present invention is its use of a small number of elements through which light must travel, thereby reducing reflections, aberrations and loss of light within the system.

The invention consists of the construction, combination and arrangement of parts as herein illustrated, described and claimed.

In the accompanying drawings, forming a part hereof, are illustrated three forms of embodiment of the present invention in which corresponding parts are given identical reference numbers, and in which.

Figure 1:
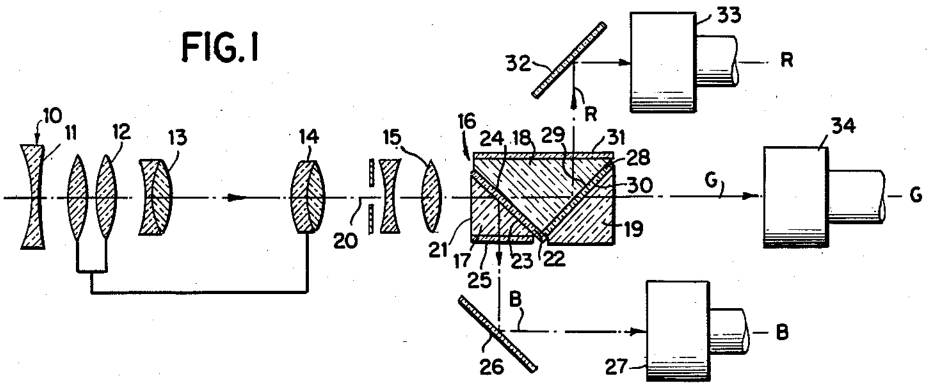
Figure 1 is a somewhat diagrammatic sectional view of a complete embodiment of a color television camera made in accordance with the present invention.

Referring to the drawings and specifically to Fig. 1, 10 indicates a varifocal lens system, such as the lenses described in U.S. Patents Numbers 2,454,686, 2,718,817 issued to Frank G. Back. Varifocal lenses of this type consist of a front lens 11, a variator 12, which is longitudinally slideable with respect to the front lens 11, an erector 13, which is fixed within the lens assembly, a compensator 14, which is slideable and coupled to the variator, and a relay 15. The relay 15 is fixed and directs the light on to the focal plane of the camera.

Immediately behind the relay 15 in Figure 1, there is disposed a prism block 16, consisting of three triangular prisms 17, 18 and 19.

The front face of the prism block 16 lies in a plane normal to the optical axis 20 of the light entering the camera. The front face 21 comprises the entrance face of the prism 17. A dichroid filter 22, hereinafter referred to as the blue reflector, is laminated between the prisms 17 and 18, and is supported by diagonal surfaces 23 and 24 of the said prisms. The blue dichroid reflector 22 reflects the blue component of the light incident thereon, and transmits the remainder of the light entering the camera. The blue component is directed through the prism 17 by the filter 22, and traverses a blue corrective filter 25, which is cemented to the bottom or exit face of the prism 17. A first totally reflecting mirror 26 is disposed in the path of the light emerging from the blue filter 25, and at an angle with respect thereto as shown in Figure 1. The light reflected from the mirror 26 is directed into an orthicon tube 27, hereinafter referred to as the blue orthicon tube.

The light, which is transmitted by the blue dichroid reflector 22, traverses the prism 18 until it reaches a red dichroid filter 28 laminated between the diagonally disposed faces 29 and 30 of the prisms 18 and 19 respectively.

The red dichroid filter reflects the red component of the beam through the prism 18. As the light leaves the prism 18, it passes through a red corrective filter 31 which is secured to the exit face of the prism 18. A second mirror 32 is disposed within the camera to receive the light emerging from the red filter 31 and direct it into an orthicon tube 33, hereinafter referred to as the red orthicon tube. The remainder of the light beam passes through the red dichroid filter and consists of the green component only. The green component is received within a third orthicon tube 34, hereinafter referred to as the green orthicon tube. The manner in which the color television signal is transmitted from the orthicon tubes 27, 33 and 34 is conventional and well-known.

Figures 2, 3:
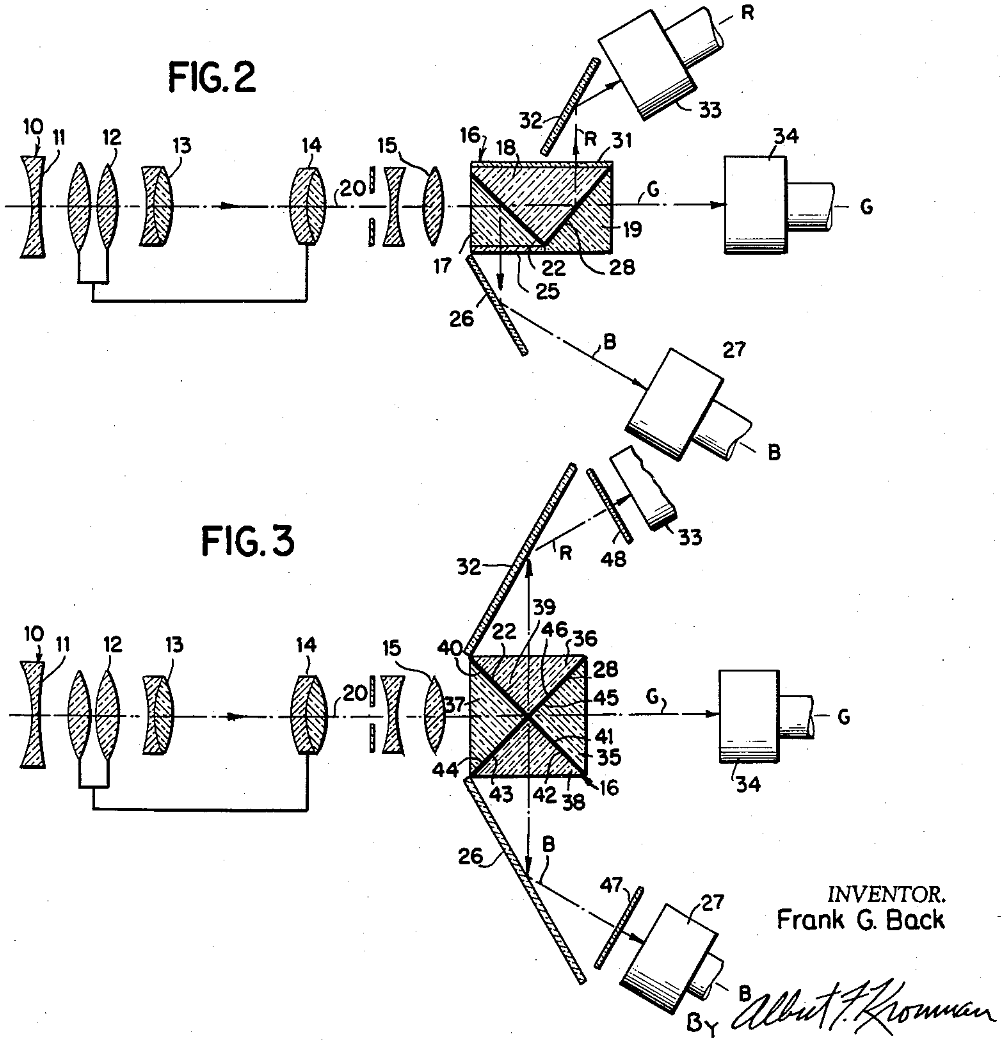
Figure 2 is a somewhat diagrammatic sectional view of a color television camera according to the present invention illustrating a second embodiment thereof.
Figure 3 is a somewhat diagrammatic sectional view of a color television camera according to the present invention illustrating a third embodiment thereof.

Referring to Figure 2, there is shown a second embodiment of the present invention in which the light entering the prism block 16 is split into the three color components blue, red and green, as described above in connection with Figure 1, and thereafter directed into the blue, red and green orthicon tubes 27, 33 and 34 by mirrors 26 and 32, which are angularly disposed so that the orthicon tubes 27 and 33 may be oriented along convergent axes within the camera. This disposition of the orthicon tubes has certain advantages from the standpoint of camera construction and tube placement. In this embodiment the blue and red dichroid reflectors 22, 28 are deposited directly upon the prism faces.

Referring to Figure 3, there is shown still another embodiment of the present invention, in which the prism block 16 is made up of four identically shaped triangular prisms 35, 36, 37 and 38. A blue dichroid filter 22 is cemented between the adjacent faces 39, 40 of prisms 36 and 37, and the adjacent faces 41, 42 of prisms 35 and 38 to form a diagonally disposed member within the prism block 16 as shown in Figure 3.

A red dichroid filter 28 is laminated between the adjacent faces 43, 44 of prisms 38 and 37 and faces 45, 46 of prisms 35 and 36 to form a second diagonally disposed element within the prism block 16. Light coming through the varifocal lens system 10 is directed into the prism block 16 where it falls upon the two dichroid filters 22 and 28. The blue element of the light beam is reflected by the blue dichroid filter 22 through the prism block 16 and on to the totally reflecting mirror 26. The red component of the light is reflected by the red dichroid filter 28, through the prism block, and on to the totally reflecting mirror 32. A blue corrective filter 47 is disposed in the path of the light leaving the mirror 26 between the mirror 26 and the blue orthicon tube 27. A red corrective filter 48 is similarly disposed between the mirror 32 and the red orthicon tube 33. The remainder of the light entering the prism block 16 passes there through and leaves it as the green component which then enters the green orthicon tube 34.

From the foregoing it will be seen that there has been provided a television camera and lens assembly which does not require field lenses, secondary relays, and other optical compensation elements. The optical properties of the varifocal lens by means of which a large back focal length may be produced have been taken advantage of to greatly simplify the optical system. Light within the prism block is handled with a minimum amount of reflections and aberrations, greatly adding to the overall efficiency of the camera. Since no field lenses are needed and no relays are needed after the light leaves the varifocal lens assembly, the system is free of additional field curvature and other aberrations. At least one stop of light is gained by reason of the herein disclosed construction. In addition, the lack of relays within the camera enables it to work with full aperture of the lens, thereby giving the system four times the light gathering efficiency of presently known devices. It will be apparent that cameras made in accordance with the present invention are not only capable of producing superior results, but can do so when directed at areas which are lighted by a much lower level of illumination than is presently required.

Having thus fully described the present invention, what is claimed as new and desired to be secured by Letters Patent of the United States is:

1. A color television camera lens system comprising, a varifocal lens system of long back focal length, a prism block to receive the light coming from the varifocal lens system, a first, a second, a third, and a fourth triangular prism in the prism block, an entrance and exit face on each of the said prisms, said prisms being disposed within the prism block in abutting relationship to form two intersecting diagonal planes through the said block, selective color reflecting filters carried between adjacent prism faces upon the diagonal surfaces within the prism block to separate the light entering the prism block into a plurality of color components, a totally reflecting mirror adjacent the prism block to receive light coming from each of the reflecting filters, a color corrective filter spaced from each of the mirrors and disposed in the path of the light reflected by said mirrors, and an orthicon tube to receive the light from each of the said corrective filters, and traversing the prism block.

2. A color television lens system according to claim 1 in which the selective color reflecting filters consist of a blue dichroid filter and a red dichroid filter, and the light reflected by the blue dichroid filter is passed through a blue corrective filter before reaching the orthicon tube, and the light reflected by the red dichroid filter is passed through a red corrective filter before reaching the orthicon tube.

3. An optical system for a color television camera having image receiving surfaces therein comprising in combination a varifocal lens system of large back focal length, a prism block to receive the light from the varifocal lens system and a plurality of selective color reflecting filters carried by the prism block to separate the light entering the prism block into a plurality of color components and direct each of said components upon one of the image receiving surfaces.

4. An optical system for a color television camera having image receiving surfaces therein comprising in combination a varifocal lens system of large back focal length, a prism block to receive the light from the varifocal lens system, a plurality of prisms in said prism block, faces on said prism diagonally disposed with respect to the optical centerline of the lens system and a plurality of selective color reflecting filters carried by the diagonally disposed prism faces on the prism block to separate the light entering the prism block into a plurality of color components and direct each of said components upon one of the image receiving surfaces.

5. An optical system for a color television camera having image receiving surfaces therein comprising in combination a varifocal lens system of large back focal length, a prism block to receive the light from the varifocal lens system, a plurality of triangular prisms in said prism block, faces on said prisms diagonally disposed with respect to the optical centerline of the lens system and a plurality of selective color reflecting filters carried by the diagonally disposed prism faces on the prism block to separate the light entering the prism block into a plurality of color components and direct each of said components upon one of the image receiving surfaces.

6. An optical system for a color television camera having image receiving surfaces therein comprising in combination a varifocal lens system of large back focal length, a prism block to receive the light from the varifocal lens system, and plurality of prisms in said prism block, faces on said prisms diagonally disposed with respect to the optical centerline of the lens system and a plurality of selective color reflecting filters carried by the diagonally disposed prism faces on the prism block to separate the light entering the prism block into a plurality of color components, and a totally reflecting mirror adjacent the prism block to receive light coming from each of the reflecting filters and direct each of said components upon one of the image receiving surfaces.

7. An optical system for a color television camera having a plurality of image receiving surfaces therein comprising in combination a varifocal lens system of large back focal length, a prism block to receive the light from the varifocal lens system, a first, second and third triangular prism in the prism block, an entrance and an exit face on each of said prisms, a plurality of prisms in said prism block, faces on said prisms diagonally disposed with respect to the optical centerline of the lens system, a selective color reflecting filter carried between adjacent prisms in the prism block to separate the light entering the prism block into a plurality of color components and direct each of said components upon one of the image receiving surfaces.

8. An optical system for a color television camera having image receiving surfaces therein comprising in combination a varifocal lens system of large back focal length, a prism block to receive the light from the varifocal lens system, a first, second and third triangular prism in the prism block, an entrance and an exit face on each of said prisms, a color corrective filter on at least one of the exit faces of the prism to further filter the selected color component directed therethrough, a plurality of prisms in said prism block, faces on said prisms diagonally disposed with respect to the optical centerline of the lens system, a selective color reflecting filter carried between adjacent prisms in the prism block to separate the light entering the prism block into a plurality of color components, and a totally reflecting mirror adjacent the prism block to receive and direct each of said components upon one of the image receiving surfaces.

9. An optical system for a color television camera having image receiving surfaces therein comprising in combination a varifocal lens system of large back focal length, a prism block to receive the light from the varifocal lens system, a first, second and third triangular prism in the prism block, said prisms being disposed in side by side relationship, an entrance face on the first prism normal to the optical axis of the lens system, a face opposite the entrance face of the first prism diagonally disposed with respect to said optical axis, and an exit face on said first prism normal to the entrance face thereon, a diagonally disposed entrance face on the second prism parallel and adjacent the diagonally disposed first prism face, a second diagonally disposed prism face on the second prism and an exit face on the second prism parallel to the optical axis of the lens system and spaced therefrom, a diagonally disposed third prism entrance face adjacent and parallel to the second diagonal face of the second prism, an exit face on the third prism normal to the optical axis of the system, a color corrective filter on at least one of the exit faces of the prisms to further filter the selected color component directed therethrough, a plurality of prisms in said prism block, faces on said prisms diagonally disposed with respect to the optical centerline of the lens system, a selective color reflecting filter carried between adjacent prisms in the prism block to separate the light entering the prism block into a plurality of color components, and a totally reflecting mirror adjacent the prism block to receive and direct each of said components upon one of the image receiving surfaces.

10. A color television camera lens system according to claim 9 in which the selective color reflecting filters comprise a blue dichroid filter and a red dichroid filter.

11. A color television camera lens system according to claim 9 in which the selective color reflecting filters comprise a blue dichroid filter and a red dichroid filter deposited upon the adjacent prism faces of the first, second and third prisms.

References Cited in the file of this patent

UNITED STATES PATENTS

| | | |
|---|---|---|
| 2,642,487 | Schroeder | June 16, 1953 |
| 2,733,291 | Kell | Jan. 31, 1956 |
| 2,740,829 | Gretener | Apr. 3, 1956 |